Patented Jan. 30, 1934

1,945,184

UNITED STATES PATENT OFFICE 1,945,184

PURIFICATION OF CRUDE COUMARIN

Erik Clemmensen, East Orange, N. J., assignor to Monsanto Chemical Company, St. Louis, Mo., a corporation of Delaware No Drawing. Application July 10, 1933, Serial No. 679,761, and in Great Britain August 11, 1931

3 Claims. (Cl. 260—54)

This invention relates to the manufacture of coumarin and it has particular application to the refining or purification of crude coumarin whereby the unreacted raw materials as well as by-products may be removed completely, resulting in a product of high degree of purity. The present application is a continuation in part of my copending application Serial Number 479,425, filed September 2, 1930.

It is a well known fact that crude coumarin regardless of its source is very difficult to isolate free of various impurities, particularly those which are slightly volatile, such as the phenols, salicylaldehyde and others. According to the present invention advantage is taken of the reaction between coumarin and sulfites or bisulfites whereby water soluble, non-volatile, stable addition products are formed. The aqueous solution of such addition products can be boiled, extracted by various solvents and heated with mineral acids below certain maximum temperatures without liberating coumarin. The aqueous solution containing the sulfite reaction product of the crude coumarin may be filtered to remove insoluble matter and thereafter freed from soluble impurities by steam or vacuum distillation or by extraction with an organic solvent. In this way one obtains a solution which contains the combined coumarin, but none of the various difficultly separable impurities present in the crude material. The coumarin is liberated by adding a mineral acid and heating until all of the sulphur dioxide is evolved. The product so obtained is washed free of acid and decolorized by simple crystallization or vacuum distillation.

Coumarin is employed extensively either alone or in combination with other aromatics as a flavor and as an ingredient of perfumes. For these purposes, it is essential that it contain no foreign odor or taste, such as may be imparted by various impurities, raw materials and by-products. Of these phenols, salicylaldehyde and chlorinated impurities are both characteristic and highly objectionable. Thus, for example, only a trace of any of these materials can be detected in the aroma of coumarin and renders it unsatisfactory. Because of the fact that these impurities have, for the most part, physical properties as well as chemical properties which do not permit of separation without exhaustive refining treatment, the losses incurred by present day processes are substantial and the cost of refining represents a sizable fraction of the total cost of the product.

It is one object of this invention to provide a method for refining coumarin by which the insoluble as well as volatile impurities may be separated completely and conveniently.

It is a further object of the invention to provide an inexpensive method of refining coumarin by which the losses of coumarin incident to the present processes for refining the crude coumarin are reduced substantially, and by which a substantial increase in the yield of refined coumarin may be had.

Coumarin is manufactured by various methods. One such method—the Perkins synthesis—involves the reaction of salicylaldehyde with acetic anhydride. Another process—the Raschig synthesis—consists in chlorinating a cresol ester, such as tricresyl phosphate, and subsequently causing the product to react with sodium acetate. Another process wherein salicylaldehyde is employed as the starting material—the Haarmann-Reimer synthesis—involves the interaction of salicylaldehyde and cyanacetic acid followed by the splitting off of carbonic acid. All of these processes result in the formation of varying amounts of tars, resins, and the crude product will contain other impurities including unreacted raw materials. Heretofore, the refining operation has entailed careful fractionation or crystallization. However, in view of the fact that many of the impurities are volatile such a procedure necessitates careful supervision of repeated refining operations, which in turn results in losses of product either by reason of decomposition or mechanical losses such as are incident to the handling of the product.

The disadvantages of this prior practice are overcome by the present invention as will be apparent from the following example: 100 parts of crude coumarin are heated with a solution of 100 parts of sodium bisulfite in 300 parts of water. The coumarin combines with the bisulfite and is fixed thereby forming a stable, non-volatile, soluble compound. After the formation of the coumarin-sulfite reaction product is complete, the solution is filtered preferably when cold to remove any resins, tars or other undissolved matter and the filtrate is concentrated by boiling until the temperature reaches about 110° C. Impurities such as salicylaldehyde, phenols, sulphur dioxide, as well as others, are thereby volatilized. Remaining traces of volatile impurities, if any, may be removed conveniently by steam distillation, while maintaining the temperature at approximately 110° C. until a perfectly odorless solution remains.

The solution so obtained is cooled and mixed with 100 parts concentrated sulphuric acid. The temperature is then gradually increased to about 125° C. during which time sulphur dioxide is evolved which may be recovered and used with soda ash in the sulfite treatment of a subsequent charge of crude coumarin. After the evolution of sulphur dioxide is no longer perceptible, the solution is diluted and cooled. The coumarin which is precipitated is washed free of sulphuric acid and will be found to have no foreign odors.

By crystallization or, preferably, vacuum or steam distillation, one is able to obtain a perfectly colorless product from the washed coumarin.

When a solvent extraction is employed the solution of the water soluble coumarin addition product is scrubbed with an organic solvent, preferably one which is immiscible with water and which can be separated therefrom by decantation. The impurities are thereby separated from the aqueous mixture. This extraction may be effected at ordinary temperatures or near the boiling point of the mixture. Various solvents may be employed including petroleum naphtha, benzol, toluol, as well as chlorinated organic solvents such as chloroform, carbon tetra chloride, ethylene dichloride and the like, the chlorinated solvents being preferred in that they do not introduce a fire hazard. After the extraction is completed the coumarin is liberated as in the previous example, preferably after any remaining solvent or other volatile impurities are removed by distillation with or without the aid of steam.

Obviously, other temperatures may be employed as well as other proportions of reagents. Similarly, other sulfites, or bisulfites which are soluble, will be found to react with the coumarin to form addition products, suitable for the purpose of this invention. If desired, one may pass sulphur dioxide into an alkaline solution containing the crude coumarin within the spirit of this invention. It will be apparent, therefore, that numerable modifications of the invention may be employed in which the feature of fixing the coumarin by means of a sulfite after which the volatile constituents are separated by distillation or by means of organic solvents is common to all.

What I claim is:

1. In the purification of crude coumarin containing organic impurities, the steps which include forming an aqueous solution of a sulphite addition product of coumarin, extracting the water solution with a solvent for the impurities associated with the coumarin in the aqueous solution, which solvent is immiscible with the aqueous solution, and subsequently regenerating the coumarin.

2. In the purification of crude coumarin containing organic impurities, the steps which include forming an aqueous solution of a sulphite addition product of coumarin, extracting the water solution with a chlorinated organic solvent for the impurities associated with the coumarin in the aqueous solution, and subsequently regenerating the coumarin.

3. The method as defined in claim 1 and further characterized in that the solution is subjected to distillation to remove traces of solvent and volatile impurities before the coumarin is regenerated.

ERIK CLEMMENSEN.